US009167606B2

(12) United States Patent
Choi

(10) Patent No.: US 9,167,606 B2
(45) Date of Patent: Oct. 20, 2015

(54) NETWORK CONNECTION CONTROL METHOD AND APPARATUS OF MOBILE TERMINAL

(75) Inventor: Hyong Uk Choi, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 292 days.

(21) Appl. No.: 13/113,406

(22) Filed: May 23, 2011

(65) Prior Publication Data

US 2012/0176929 A1    Jul. 12, 2012

(30) Foreign Application Priority Data

Jan. 10, 2011  (KR) .................... 10-2011-0002396

(51) Int. Cl.
*H04W 76/02* (2009.01)
*H04W 28/10* (2009.01)

(52) U.S. Cl.
CPC .............. *H04W 76/02* (2013.01); *H04W 28/10* (2013.01)

(58) Field of Classification Search
CPC ..... H04W 84/12; H04W 80/00; H04W 36/14; H04W 36/0011; H04W 76/02; H04W 36/30
USPC .......................................... 370/253
See application file for complete search history.

(56) References Cited

U.S. PATENT DOCUMENTS

| 6,526,034 | B1 | | 2/2003 | Gorsuch ..................... 370/338 |
| 7,254,136 | B1 | * | 8/2007 | Gunter et al. ................ 370/401 |
| 2007/0245176 | A1 | * | 10/2007 | Sawane et al. ............... 714/704 |
| 2008/0247317 | A1 | * | 10/2008 | Weil et al. .................... 370/237 |
| 2009/0245176 | A1 | * | 10/2009 | Balasubramanian et al. 370/328 |
| 2010/0067524 | A1 | * | 3/2010 | Luthra ......................... 370/389 |
| 2011/0286437 | A1 | * | 11/2011 | Austin et al. ................. 370/338 |
| 2011/0310787 | A1 | * | 12/2011 | Sheriff et al. ................ 370/315 |

FOREIGN PATENT DOCUMENTS

| JP | 10-304071 | 11/1998 | ............. H04L 12/28 |
| KR | 2004-037637 | 5/2004 | ............. H04Q 7/38 |
| KR | 10-0661181 | 12/2006 | ............. H04B 1/40 |

* cited by examiner

*Primary Examiner* — Huy D Vu
*Assistant Examiner* — Bao G Nguyen
(74) *Attorney, Agent, or Firm* — Cha & Reiter, LLC.

(57) ABSTRACT

A network connection control method and apparatus of a mobile terminal maintains or releases connection to a wireless network based on the existence of downlink traffic from the wireless network. The method preferably includes connecting to a wireless network transmitting a signal greater than a predetermined value in strength when an Internet access request is detected; requesting the connected wireless network for traffic; determining whether the traffic is received from the connected wireless network; and releasing the connection to the wireless network by determining the wireless network as an idle wireless network when no traffic is received. The determination as to whether to maintain or release the connection to the currently connected WLAN based on whether actual traffic is received from the WLAN. When the mobile terminal is connected to an Access Point not coupled to the Internet, the mobile terminal immediately switches the connection to a cellular network.

11 Claims, 6 Drawing Sheets

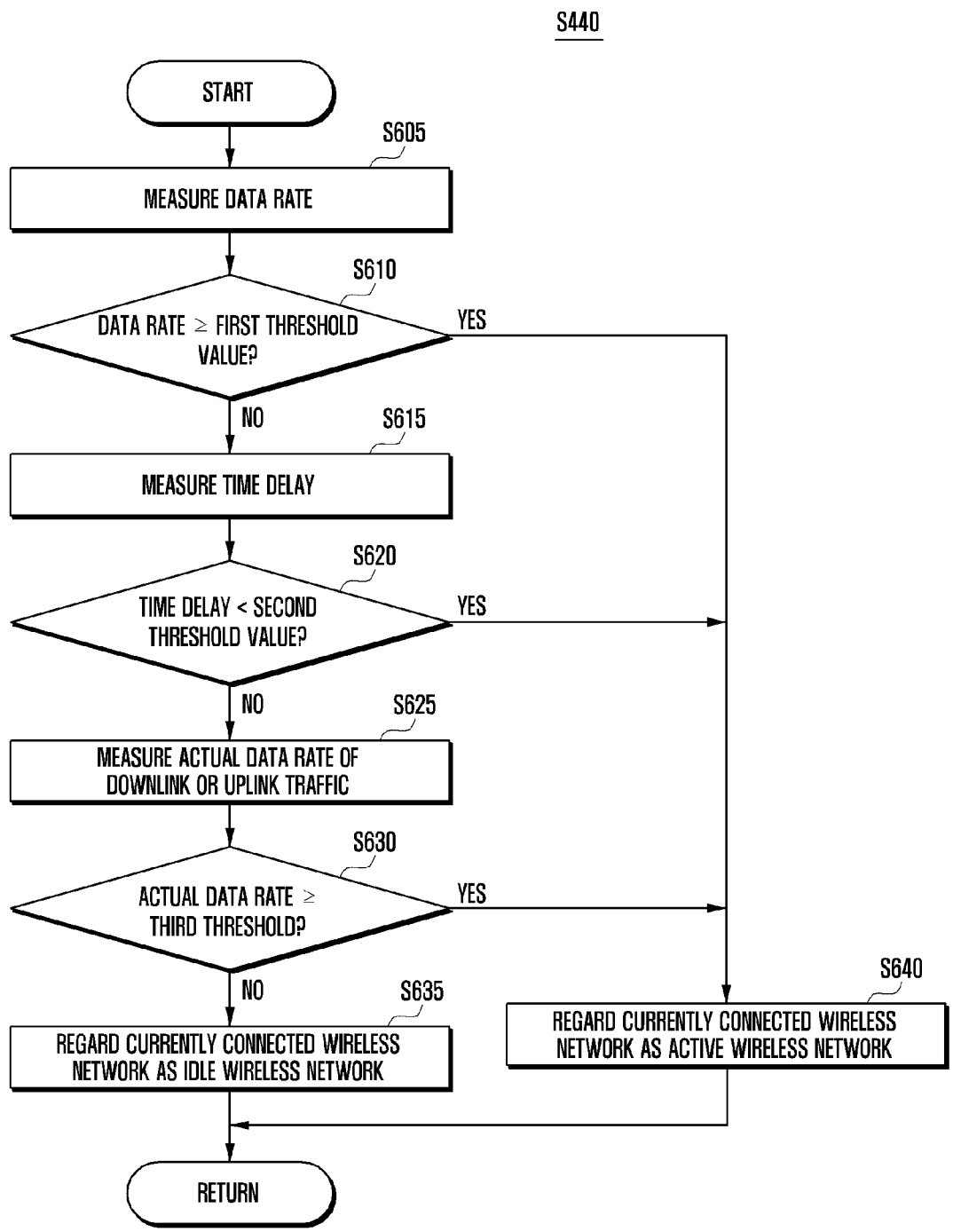

NETWORK CONNECTION CONTROL METHOD AND APPARATUS OF MOBILE TERMINAL

CLAIM OF PRIORITY

This application claims the benefit of priority under 35 U.S.C. §119 from Korean patent application No. 10-2011-0002396 filed on Jan. 10, 2011, the contents of which are incorporated by reference in its entirety.

BACKGROUND OF THE INVENTION

1. Field of the Invention

The present invention relates to a mobile communication system utilizing high speed communication. More particularly, the present invention relates to a network connection control method and apparatus of a mobile terminal that mitigates resource shortages and meets the high-speed service requirements of subscribers.

2. Description of the Related Art

Mobile communication systems have been developed previously to provide the subscribers with voice communication services while in motion, particularly when away from home. With the advancement of communication technologies, the art of mobile communications has evolved to support high speed data communication services as well as the standard voice communication services. However, there is a long-felt need for a more sophisticated mobile communication system than known heretofore in order to mitigate resource shortages and meet the growing high-speed service requirements of the subscribers who own or operate mobile communication terminals.

Meanwhile, due to the widespread popularity of Wireless Local Area Network (WLAN), WLAN access has become one of the basic functions included in recent portable devices including smartphones, laptop computers, MP3 players, Personal Multimedia Players (PMP), etc. This WLAN capability allows the users to access the Internet with a WLAN-enabled portable device anytime virtually anywhere.

Typically, a WLAN is implemented with an Access Point (AP) which allows access to the Internet. However, a problem arises where a plurality APs which are not connected and only of which Radio Frequencies are activated. In such an environment, the mobile terminal is likely to be connected to one of the APs that are not coupled to the Internet, and thus to be operating in standby mode unnecessarily for long periods of time.

FIG. 1 is a schematic diagram illustrating a conventional communication environment where a mobile terminal accesses the Internet via an AP or base station.

Referring to FIG. 1, a conventional mobile terminal 100 has a connection preference policy with which the mobile terminal selects a network to access the Internet. Typically, the connection preference policy is designed, such that the stronger the received signal strength is and the cheaper the connection cost is, the higher the connection priority. Accordingly, it is likely that the WLAN network is assigned the higher connection priority as compared to the cellular network. Once the WLAN is selected for the Internet Access, the mobile terminal 100 attempts connection to the AP with the highest Received Signal Strength Indication (RSSI) first among the discovered APs.

However, a problem occurs because the conventional connection preference policy is configured such that the connection priority is determined based on the received signal strength without consideration of whether there is actual data traffic from the Internet. Suppose that the AP 130 is active but not connected to the Internet and the mobile terminal 100 approaches the AP 130. The mobile terminal 100 makes a connection to the AP 130 with the highest RSSI and waits for receiving traffic. However, since the AP 130 is not connected to the Internet 150, no traffic is received such that the user cannot access the Internet normally.

There is therefore a need to release quickly the mobile terminal's connection to an AP that is not coupled to the Internet.

SUMMARY OF THE INVENTION

The present invention provides a network connection control method and apparatus of a mobile terminal that quickly releases or maintains the connection to a network based on whether or not there is actual downlink traffic or not.

In accordance with an exemplary aspect of the present invention, a network connection control method of a mobile terminal preferably includes connecting, when an Internet access request is detected, to a wireless network transmitting a signal greater than a predetermined value in strength; requesting the connected wireless network for traffic; determining whether the traffic is received from the connected wireless network; and releasing the connection to the wireless network, when no traffic is received, by determining the wireless network as being an idle wireless network.

In accordance with another exemplary aspect of the present invention, a mobile terminal preferably includes a wireless network unit which discovers wireless networks when an Internet access request is input, and connects to a wireless network transmitting a signal greater than a predetermined strength; and a control unit which sends a traffic request, determines whether traffic is received from the connected wireless network in response to the traffic request, and determines the wireless network as being an idle wireless network, when no traffic is received, and releases the connection to the idle wireless network.

BRIEF DESCRIPTION OF THE DRAWINGS

The above attributes and advantages of the presently claimed invention will become more apparent from the following detailed description in conjunction with the accompanying drawings, in which:

FIG. 6 is a flowchart illustrating steps of the uplink/downlink traffic inspection process of the network connection control method of FIG. 4.

DETAILED DESCRIPTION

In the following description, the term "active network" preferably denotes the wireless network implemented with an Access Point (AP) which transmits a signal equal to or greater than a predetermined size and is coupled to the Internet. The mobile terminal can access the Internet via the active network.

In the following description, the term "idle network" preferably denotes the wireless network implemented with an AP which transmits a signal equal to or greater than a predetermined size but not coupled to the Internet, including dummy AP. The dummy AP of the presently claimed invention preferably transmits a signal equal to or greater than a predetermined size. Accordingly, the mobile terminal discovers the dummy AP and connects to the idle network of the dummy AP but cannot access the Internet.

Exemplary embodiments of the present invention are described with reference to the accompanying drawings in detail. The same reference numbers are used throughout the drawings to refer to the same or like parts. For the purposes of clarity and simplicity, detailed description of well-known functions and structures incorporated herein may be omitted to avoid obscuring the subject matter of the present invention.

The mobile terminal 100 can access the Internet 150 via one of the APs 110 and 120 or the base station 140 of a cellular communication system.

In the following description, the network among the Internet 150, the APs 110 and 120, and the mobile terminal 100 is called wireless network. Typically, the network formed to support the Internet access within the coverage of a wireless access device such as the APs 110 and 120 is called Local Area Network (LAN) or Wireless LAN (WLAN). The mobile terminal 100 can access the Internet via the WLAN.

Meanwhile, the network formed with the Internet 150, the cellular base station 140, and the mobile terminal 100 is preferably referred to as a cellular network. The mobile terminal 100 can access the Internet via the WLAN or the cellular network.

Since the WLAN supports wider bandwidth as compared to the cellular network, the Internet access via the WLAN is superior to the Internet access via the cellular network in view of Internet access speed and data transmission rate. Also, since the installation cost of the WLAN AP is cheaper than that of the cellular base station, the Internet access cost of the WLAN is cheaper than that of the cellular network.

Figure 1:
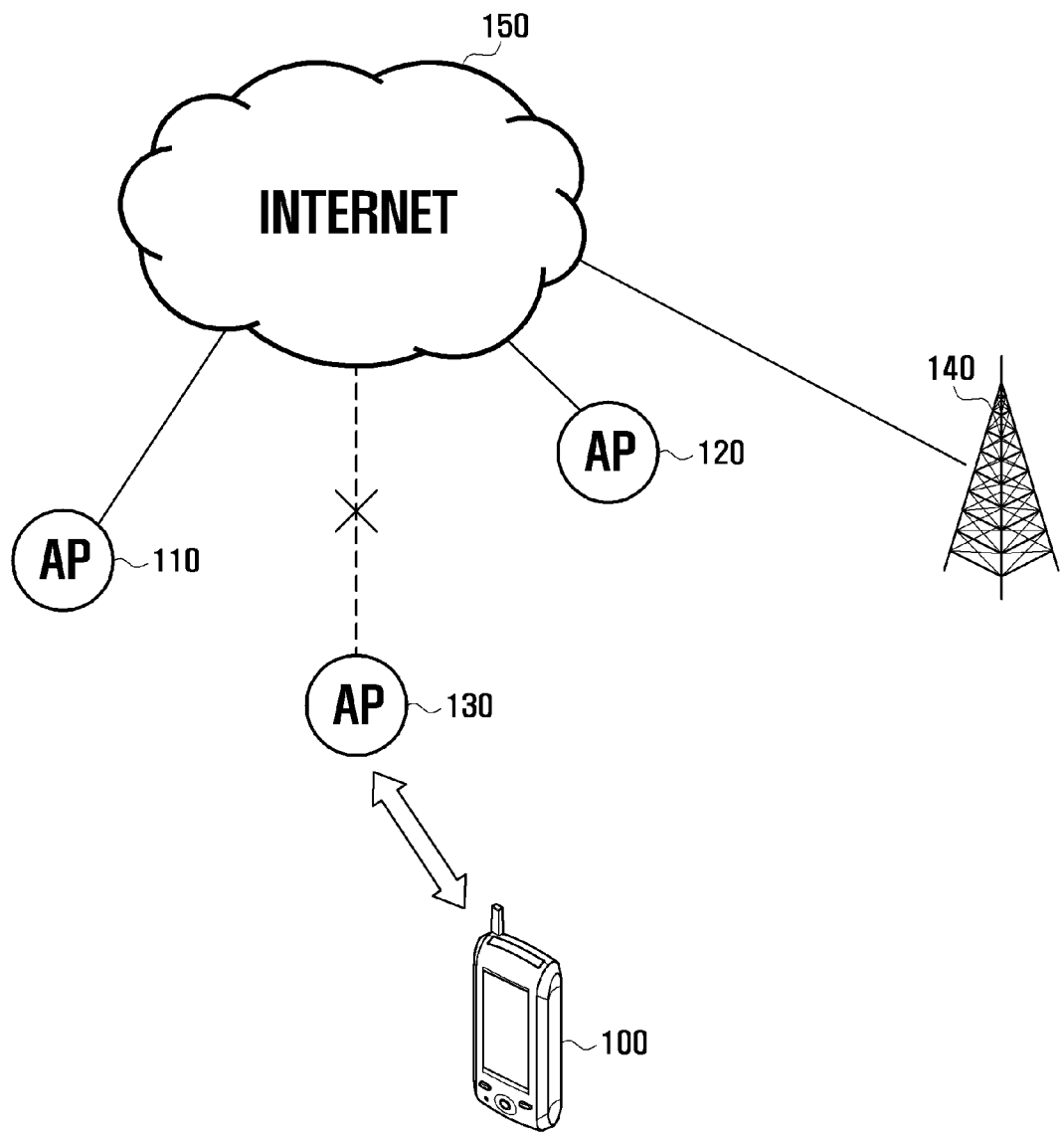
FIG. 1 is a schematic diagram illustrating a conventional communication environment where a mobile terminal accesses the Internet via an AP or base station.

To restate the problem with conventional operation, in case that the mobile terminal 100 connects to AP 130 (FIG. 1) which is not coupled to the Internet 150, it is necessary to release the connection to the AP 130 quickly. Preferably, it is required that the mobile terminal 100 switches the connection to another WLAN or a cellular network for the Internet service.

In order to solve this problem, the present invention provides a network connection control method and apparatus of a mobile terminal that preferably determines whether to maintain or release the connection to a wireless network based on the existence of actual traffic from the connected network.

Figure 2:
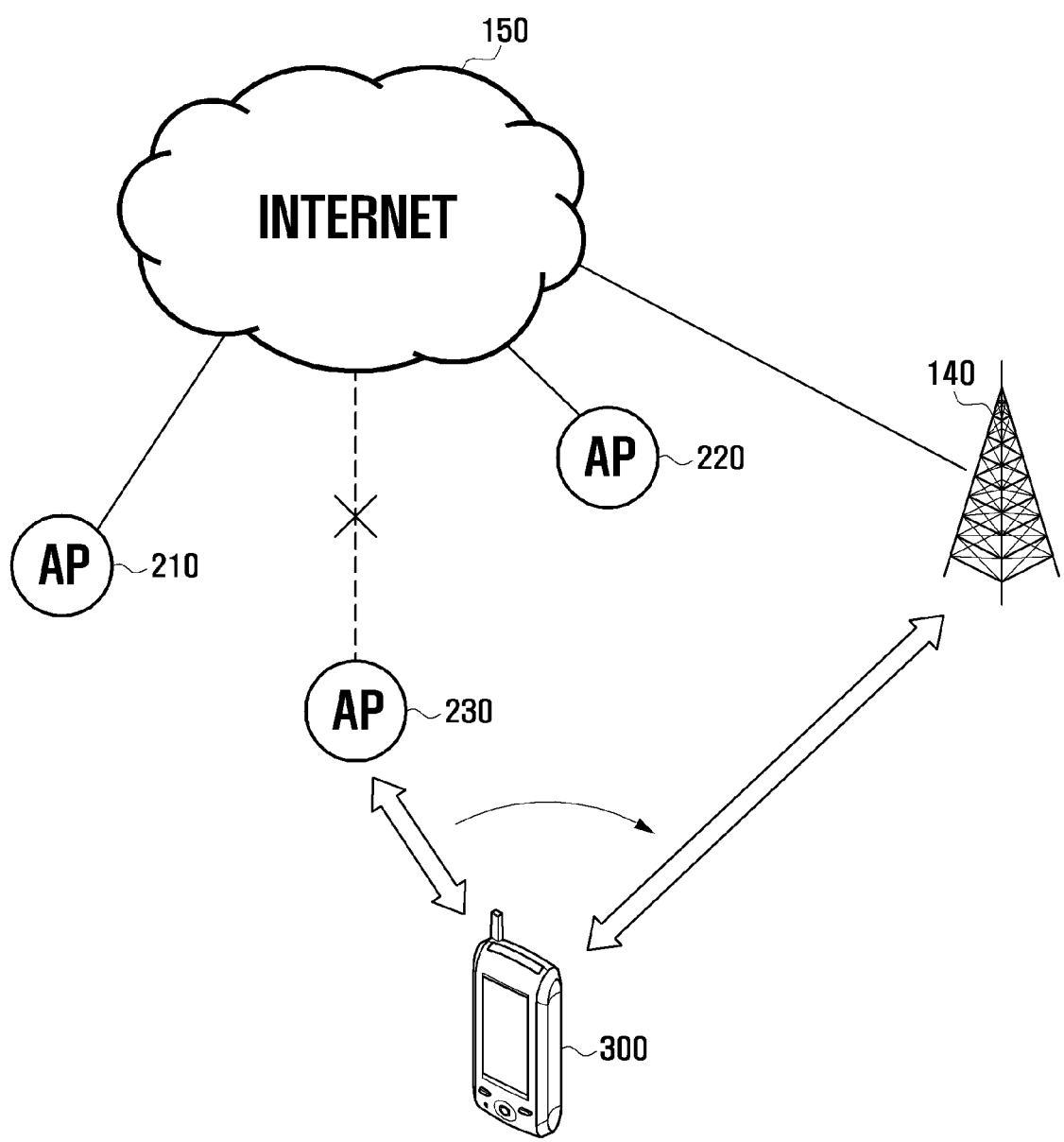
FIG. 2 is a schematic diagram illustrating a communication environment where the network connection control method according to an exemplary embodiment of the present invention is applied.

Referring to FIG. 2, it is assumed that the mobile terminal 300 is connected to the WLAN via the AP 230. The AP 230 is a dummy AP which is not connected to the Internet 150 but of which RF is activated to transmit a signal equal to or greater than a predetermined size.

According to an exemplary embodiment of the present invention, the mobile terminal 300 determines whether the connected WLAN transmit actual traffic. If the traffic is received from the connected WLAN, the mobile terminal 300 determines the WLAN is an active WLAN and maintains the connection to the active WLAN. Otherwise, if no traffic is received from the connected WLAN, the mobile terminal 300 determines the WLAN as being an idle WLAN and releases the connection to the idle WLAN. After releasing the connection to the idle WLAN, the mobile terminal 300 attempts connection to a cellular network.

In an exemplary case of a channel on which the user is connected to the WLAN but not the Internet, the mobile terminal 300 switches the connection to the cellular network, thereby acquiring access to the Internet quickly and, as a consequence, improving mobile Internet service quality.

According to an exemplary embodiment of the present invention, in case that the connected AP transmits a signal equal to or greater than a predetermined size but is not coupled to the Internet, the mobile terminal releases the connection to the AP. Accordingly, the aforementioned scenario is distinguishable from the handover to another AP or cellular network that occurs when the connected AP does not transmit the signal equal to or greater than a predetermined size.

Figure 3:
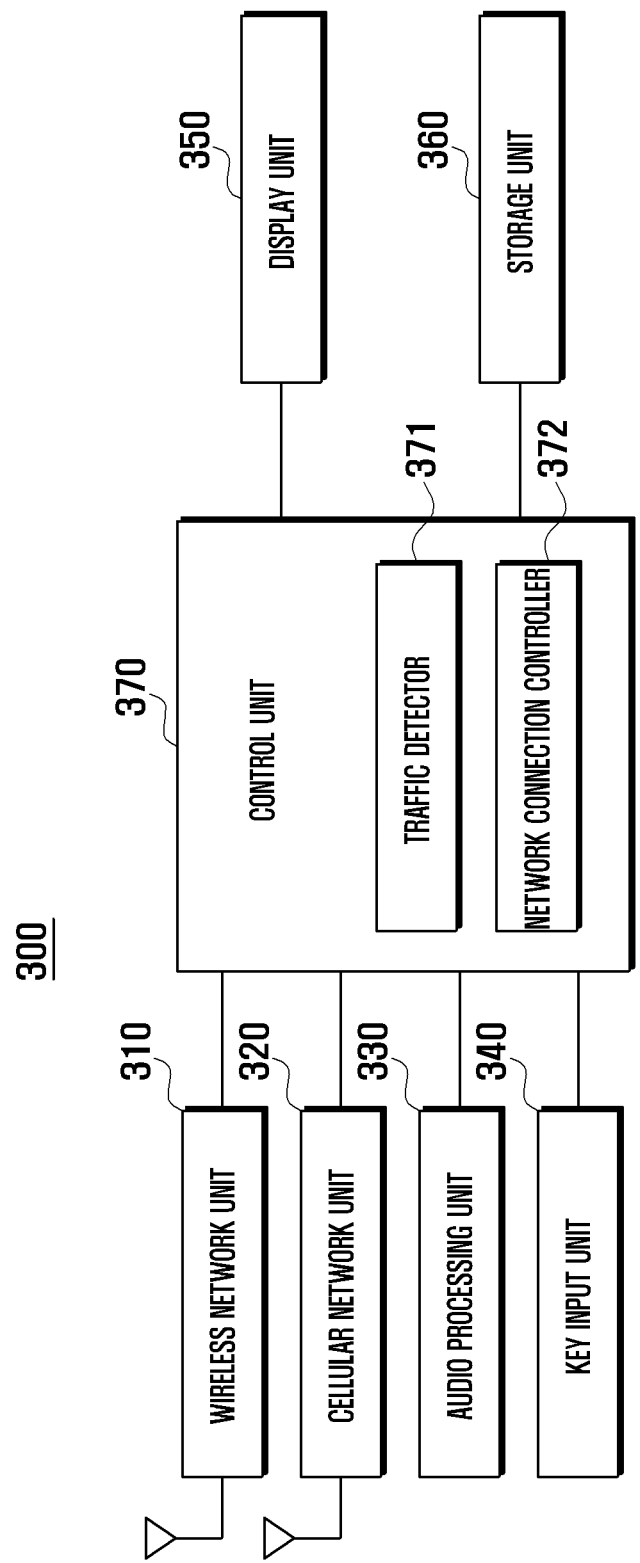
FIG. 3 is a block diagram illustrating a configuration of the mobile terminal according to an exemplary embodiment of the present invention.

FIG. 3 is a block diagram illustrating a configuration of the mobile terminal according to an exemplary embodiment of the present invention. As shown in FIG. 3, the mobile terminal 300 preferably includes a wireless network unit 310, a cellular network unit 320, an audio processing unit 330, a key input unit 340, a display unit 350, a storage unit 360, and a control unit 370. The control unit 370 may preferably include a traffic detector 371 and a network connection controller 372.

The wireless network unit 310 attempts connection to an AP with the receipt of a signal. As aforementioned, the connection to an AP is called WLAN connection. According to an exemplary embodiment of the present invention, the wireless network unit 310 may comprise a Wi-Fi module abiding by the IEEE 802.11 standard.

The wireless network unit 310 performs scanning of all available channels, broadcasts a probe request, and receives a probe response transmitted by the APs in response to the probe request. In this manner of action by the wireless network unit 310, the mobile terminal 300 can discover the APs. In case that the user requests for the connection to an AP, the wireless network unit 310 transmits an association request message to the AP and receives an association response transmitted by the AP in response to the association request. In this manner, the mobile terminal 300 can connect to the AP.

The cellular network unit 320 is responsible for cellular communication of the mobile terminal 300. The cellular network unit 320 can include an RF transmitter for up-converting and amplifying the transmit signal frequency and an RF receiver for low noise amplifying and down-converting the receive signal frequency. The cellular network unit 320 delivers the data received over a radio channel to the control unit 370 and transmits the data output by the control unit 370 over the radio channel. According to an exemplary embodiment of the present invention, the cellular network unit 320 can receive the radio signal necessary for accessing the Internet.

The audio processing unit 330 preferably includes a codec pack, and the codec pack preferably includes a data packet for processing packet data and an audio codec for processing audio signal including voice. The audio processing unit 330 converts a digital audio signal to an analog audio signal by means of the audio codec so as to output the analog audio signal through a speaker (SPK) in the form of an audible sound wave and converts the analog audio signal input through the microphone (MIC) to a digital audio signal.

The key input unit 340 receives a key input by the user and sends a key signal corresponding to the key to the control unit 370. The key input unit 340 can be implemented with a keypad having a plurality of alphanumeric keys, navigation keys, and functions keys formed at one side of the mobile terminal 300. According to an exemplary embodiment of the present invention, the key input unit 340 can receive an Internet access request input by the user and send the Internet access request to the control unit 370.

Still referring to FIG. 3, the display unit 350 can be implemented with one of a Liquid Crystal Display (LCD), Organic Light Emitting Diodes (OLED), and Active Matrix OLED (AMOLED) to provide the user with the menus of the mobile terminal 300, input data, function settings, and other various information in the form of visual data. The display unit 350 is responsible for displaying the booting screen, standby mode screen, menu screen, and application execution screens. According to an exemplary embodiment of the present invention, the display unit 350 preferably displays a status indication bar for indicating the connection status to the WLAN and/or the cellular network.

The storage unit 360 stores the programs and data necessary for the operations of the mobile terminal 300 and can be divided into a program region and a data region. The program region stores the programs for controlling the entire operations of the mobile terminal, the Operating System (OS) for booting up the mobile terminal, and the application programs necessary for the supplementary functions of the mobile terminal 300 such as camera function, audio playback function, and still/motion picture playback function. The data region can store the data generated according to the use of the mobile terminal 300 such as images, videos, phonebooks, and audio data.

According to an exemplary embodiment of the present invention, the storage unit 360 stores an idle AP list containing the information of the APs which are not connected to the Internet but of which RFs are activated. The idle AP list can contain the Media Access Control (MAC) addresses of the APs 130 that are not connected to the Internet. Table 1 shows an exemplary idle AP list.

TABLE 1

| AP (WLAN) name | MAC address | Access time | Access location |
|---|---|---|---|
| T-Zone | MHA0100ODJF | Oct. 10, 2010 | Latitude AAAAA Longitude BBBBB |
| KT-Zone | ADSF09598AS | Dec. 25, 2010 | Latitude CCCCC Longitude DDDDD |
| LGT-Zone | ADDF0874357 | Dec. 26, 2010 | Latitude EEEEE Longitude FFFFF |
| — | — | — | — |
| — | — | — | — |

As shown in table 1, the idle AP list according to an exemplary embodiment of the present invention preferably includes the AP name, MAC address, access time, and access location columns. Although table 1 shows 4 exemplary columns, the idle AP list can be designed to have other informative columns, and there could be greater or few than four.

The control unit 370 controls general operations of the internal components of the mobile terminal 300. Particularly when the mobile terminal 300 is connected to a WLAN, the control unit 370 controls to keep or release the connection to the WLAN based on whether there is actual traffic received from the WLAN.

For the purpose of detecting traffic from the WLAN, the control unit 370 can include a traffic detector 371 and a network connection control controller 372.

When the mobile terminal 300 connects to the WLAN, the traffic detector 371 determines whether or not actual traffic is received from the WLAN. The traffic detector 371 checks whether an IP packet is received in Transmission Control Protocol/Internet Protocol (TCP/IP) level. If it there is no actual traffic received from the WLAN, the traffic detector 371 regards the currently connected WLAN as being an idle WLAN. Otherwise, if there is actual traffic received from the WLAN, the traffic detector 371 regards the currently connected WLAN as an active WLAN. The traffic detector 371 communicates the determination result to the network connection controller 372.

With continued reference to FIG. 3, the network connection controller 372 controls the network access process of the mobile terminal 300. In case of the initial WLAN access, the network connection controller 372 compares the Received Signal Strength Indications (RSSIs) of the signals from the individual APs and attempts to connect to the AP having the highest RSSI.

If a signal indicating the connection to an idle WLAN is received from the traffic detector 371, the network connection controller 372 releases the connection to the idle WLAN and attempts access to a cellular network. According to another exemplary embodiment of the present invention, if a signal indicating the connection to an idle WLAN is received from the traffic detector 371, the network connection controller 372 attempts to connect another WLAN.

Although it is has been shown and described that the control unit 370 includes the traffic detector 371 and the network connection controller 372 implemented separately for illustrative purposes, the present invention is not limited thereto. For example, the traffic detector 371 and the network connection controller 372 can be integrated into the control unit 370 which executes the functions of the traffic detector 371 and the network connection controller 372.

Figure 4:
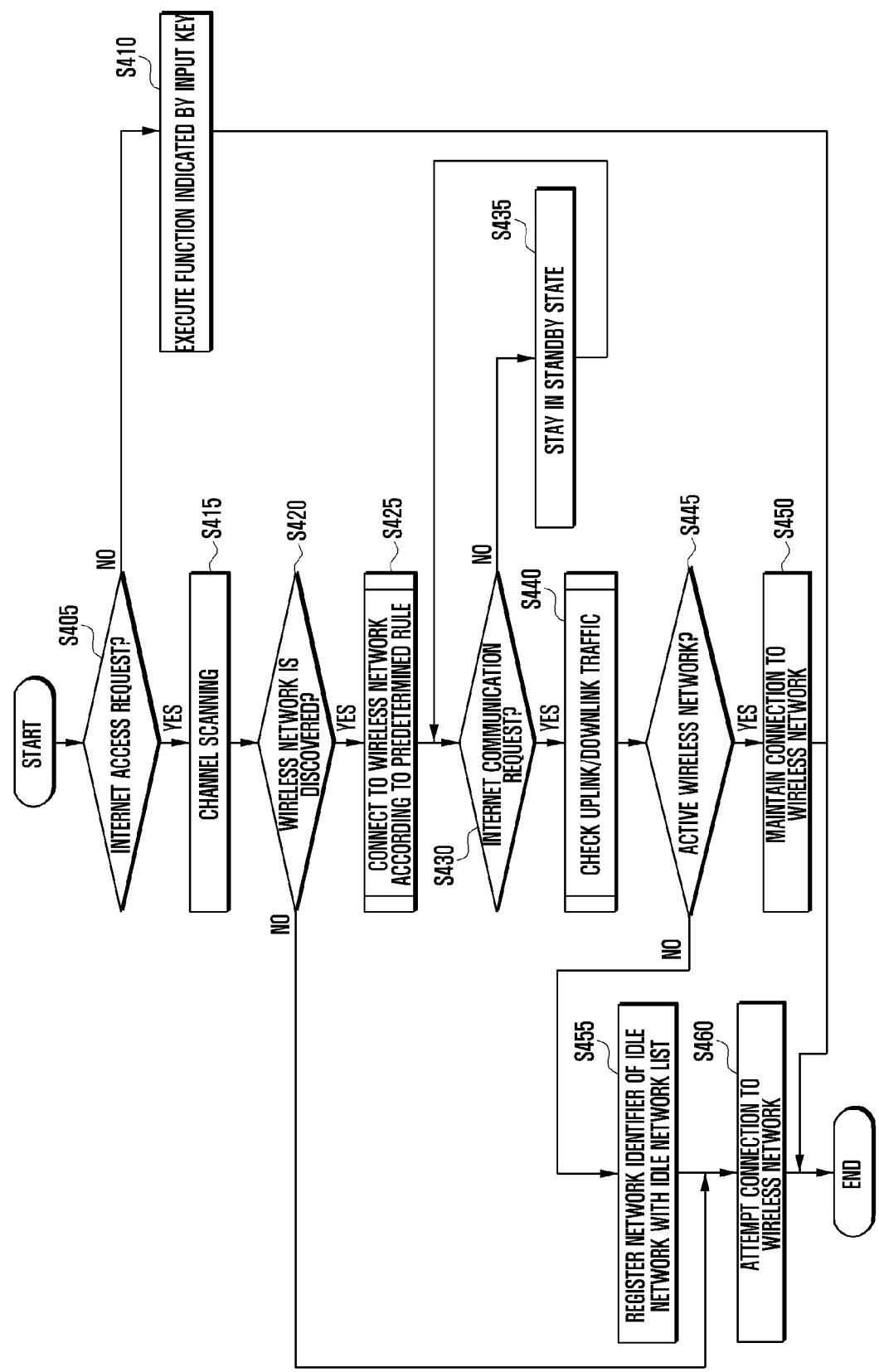
FIG. 4 is a flowchart illustrating a network connection control method of the mobile terminal according to an exemplary embodiment of the present invention.

FIG. 4 is a flowchart illustrating a network connection control method of the mobile terminal according to another embodiment of the present invention.

Referring to FIG. 4, the control unit 370 of the mobile terminal 300 monitors to detect a key input by means of the key input unit 340 or a touchscreen, and, if a key is input, determines whether the key is an Internet access request key (S405).

If at (S405) the input key is not the Internet access request key, then at (S410) the control unit 370 executes the function, e.g., call placement or multimedia file playback, indicated by the input key (S410).

If the input key is the Internet access request key, then at (S415) the control unit 370 performs channel scanning. In an exemplary embodiment of the present invention, the channel scanning is a process for detecting signals on the radio channels of the APs 210, 220, and 230 and the cellular base station 240. The control unit 370 discovers the WLANs based on the signals transmitted by the APs 210, 220, and 230 and the cellular network based on the signal transmitted by the base station 240.

As a consequence of the channel scanning result at (S415), the control unit 370 at (S420) determines whether a WLAN is discovered.

If not WLAN is discovered, i.e. if no signal is received from any of the APs 210, 220, and 230, then at (S460) the control unit 370 attempts access to the cellular network. In case that no cellular network is discovered too, the control unit 370 can stop attempting access to the Internet.

If at least one WLAN is discovered at step S420, then at (S425) the control unit 370 performs a WLAN connection process according to a predetermined rule. The WLAN connection process is described later with reference to FIG. 5.

Once the mobile terminal 300 connects to the WLAN successfully, at (S430) the control unit 370 determines whether an Internet communication request is input. If no Internet access request is received, (at S435) the control unit 370 stays in the standby state. The standby state is the state where the mobile terminal 300 is connected to the WLAN but not received any traffic.

If the Internet access request is received at step S430, at (S440) the control unit 270 performs an uplink/downlink traffic inspection process. In order to inspect the uplink/downlink traffic, the control unit 370 can check whether an IP packet is actually communicated in the Transmission Control Protocol/Internet Protocol (TCP/IP) level.

Next, at (S445) the control unit 370 determines whether the currently connected WLAN is an active WLAN or an idle WLAN. In case that the traffic is received from the WLAN, the control unit 370 determines that the currently connected WLAN is an active WLAN. In case that no traffic is received from the WLAN, the control unit 370 determines that the currently connected WLAN is an idle WLAN.

If it is determined at (S445) that the currently connected WLAN is an active WLAN, at (S450) the control unit 370 maintains the connection to the current WLAN. Otherwise if it is determined at (S445) that the currently connected WLAN is an idle WLAN, then at (S455) the control unit 370 registers the network identifier of the currently connected WLAN, i.e. the identifier of the current AP, with the idle WLAN list. The network identifier can be the Media Access Control (MAC) address of the AP.

Next, at (S460) the control unit 370 releases the connection to the WLAN and attempts access to the cellular network.

Figure 5:
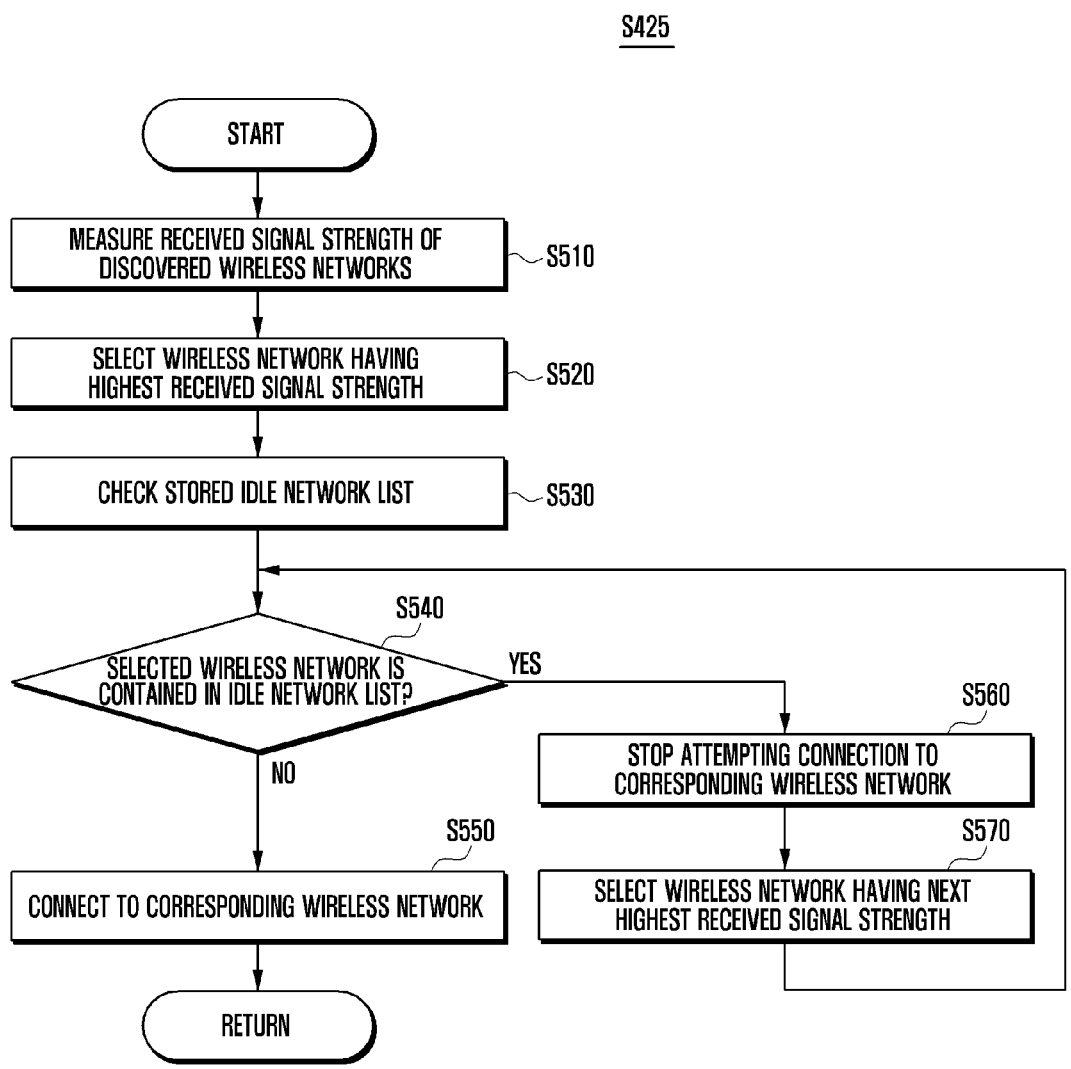
FIG. 5 is a flowchart illustrating steps of the WLAN connection process of the network connection control method of FIG. 4.

FIG. 5 is a flowchart illustrating steps of the WLAN connection process of the network connection control method of FIG. 4.

In the WLAN connection process, at (S510) the control unit 370 measures the Received Signal Strength Indicator (RSSI) of each of the discovered WLANs. According to an exemplary embodiment of the present invention, the control unit 370 manages a list of the discovered WLANs ordered by RSSI.

Next, at (S520) the control unit 370 selects the WLAN having the highest RSSI value and at (S530) checks the idle WLAN list stored previously in the storage unit 360.

Next, at (S540) the control unit 370 determines whether the selected WLAN is contained in the idle WLAN list. This step is performed to facilitate the connection establishment by excluding the dummy WLANs that are known already.

If at (S540) the selected WLAN is contained in the idle WLAN list, then at (S560) the control unit 370 stops attempting connection to the corresponding WLAN.

Next, at (S570) the control unit 370 selects another WLAN having the next highest RSSI value and returns the process to step S540. In other words, the control unit 370 controls network connection based on whether the selected WLAN is contained in the idle WLAN list.

If at (S540) the selected WLAN is not contained in the idle WLAN list at step, then at (S550) the control unit 370 controls such that the mobile terminal 300 connects to the corresponding WLAN.

FIG. 6 is a flowchart illustrating steps of the uplink/downlink traffic inspection process of the network connection control method of FIG. 4.

Referring now to FIG. 6, in the uplink/downlink traffic inspection process, at (S605) the control unit 370 measures the data rate, i.e. the traffic transmission speed, of the WLAN. The data rate is measured formally in proportion of to the RSSI value. In other words, the greater is the RSSI value, the higher is the data rate.

Next, at (S610) the control unit determines the measured data rate is equal to or greater than a first threshold value. If the measured data rate is equal to or greater than the first threshold value, then at (S640) the control unit 370 determines that the currently connected WLAN is an active WLAN.

Otherwise if at (S610) the measured data rate is less than the first threshold value, then at (S615) the control unit 270 measures a time of the WLAN. The time delay means the time duration for which no traffic is received.

With continued reference to FIG. 6, at (S620) the control unit 370 determines whether the measured time delay is less than a second threshold value. If the time delay is less than the second threshold value, this means that any traffic is received in a predetermined reference time. If the measured time delay is less than the second threshold value, then at (S640) the control unit 370 determines that the currently connected WLAN is an active WLAN.

Otherwise if the measured time delay is equal to or greater than the second threshold value, i.e. no traffic is received in a predetermined reference time, then at (S625) the control unit 370 measures the data rate of the traffic actually received. In order to measure the data rate of the actual traffic, the control unit 370 measures the reception data rate of the payload of IP packets in the TCP/IP (Transmission Control Protocol/Internet Protocol) level.

Next, at step (630) the control unit 370 determines whether the data rate of the actual traffic is equal to or greater than a third threshold value. If the data rate of the actual traffic is equal to or greater than the third threshold value, then at (S640) the control unit 370 determines that the currently connected WLAN is an active WLAN.

Otherwise if the data rate of the actual traffic is less than the third threshold value, then at (S635) the control unit 370 determines that the currently connected WLAN as an idle WLAN.

The control unit 370 determines whether the currently connected WLAN is an active WLAN or an idle WLAN through the process as depicted in FIG. 6 and maintains or releases the connection to the corresponding WLAN depending on the determination result (see FIG. 4).

As described above, the network connection control method and apparatus of the present invention checks the Internet connectivity of the currently connected AP and switches, when the currently connected AP is not connected to the Internet, the connection to a cellular network immediately, resulting in improvement of mobile Internet service quality.

The network connection control method and apparatus of the present invention determines whether to maintain or release the connection to the currently connected WLAN based on whether actual traffic is received from the WLAN. If it is determined that the mobile terminal is connected to an AP which is not coupled to the Internet, the mobile terminal switches the connection to a cellular network immediately.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

The above-described methods according to the present invention can be realized in hardware or as software or computer code that can be stored in a non-transitory recording medium such as a CD ROM, a RAM, thumbnail drive, a floppy disk, a flash storage, a hard disk, or a magneto-optical disk or downloaded over a network and stored in storage, so that the methods described herein can be executed by such software using a general purpose computer, special computer, microprocessor, special processor, or in a programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

What is claimed is:

1. A network connection control method of a mobile terminal, comprising:
    detecting by a mobile terminal a request to access the Internet and connecting to a wireless network;
    requesting traffic from the connected wireless network;
    determining, if a signal strength received from the connected wireless network is equal to or greater than a predetermined signal strength, that the wireless network is an active network coupled to the Internet and maintaining connection to the wireless network;
    measuring a time duration until traffic is received from the connected wireless network if the signal strength received from the wireless network is less than the predetermined signal strength;
    determining, if the time duration is less than a predetermined time, that the wireless network is the active network coupled to the Internet and maintaining connection to the wireless network;
    measuring a data rate of payload of Internet Protocol (IP) packets if the time duration is equal to or greater than the predetermined time;
    determining the wireless network is the active network connected to the Internet and maintaining the connection to the wireless network if the measured data rate is equal to or greater than a predetermined value; and
    releasing the connection to the wireless network if no traffic is received.

2. The network connection control method of claim 1 further comprising,
    registering an identifier of the wireless network with an idle network list.

3. The network connection control method of claim 2, wherein the connecting to the wireless network comprises:
    selecting for connection a candidate wireless network having a highest received signal strength by measuring received signal strengths of discovered wireless networks;
    determining whether the candidate wireless network is contained in the idle network list; and
    stopping connection to the candidate wireless network, if the candidate wireless network is contained in the idle network list.

4. The network connection control method of claim 3, further comprising beginning connection to another candidate network having a next highest received signal strength after stopping connection to the candidate wireless network.

5. The network connection control method of claim 1, wherein determining the wireless network is an idle wireless network not connected to the Internet and releasing the connection to the wireless network, if the measured data rate is less than the predetermined value.

6. The network connection control method of claim 1, further comprising discovering another wireless network and connecting to said another wireless network after releasing the connection to an idle wireless network.

7. A mobile terminal comprising:
    a wireless network unit for discovering wireless networks and connecting to a particular wireless network if an Internet access request is input; and
    a control unit configured to:
    send a traffic request;
    determine, if a signal strength received from the connected wireless network is equal to or greater than a predetermined signal strength, that the wireless network is an active network coupled to the Internet and maintaining connection to the wireless network;
    measure a time duration until traffic is received from the connected wireless network if the signal strength received from the wireless network is less than the predetermined signal strength;
    determine, if the time duration is less than a predetermined time, that the wireless network is the active network coupled to the Internet and maintaining connection to the wireless network;
    measure a data rate of payload of Internet Protocol (IP) packets if the time duration is equal to or greater than the predetermined time;
    determine the wireless network is the active network connected to the Internet and maintain the connection to the wireless network if the measured data rate is equal to or greater than a predetermined value, and
    release, if no traffic is received, the connection to the wireless network.

8. The mobile terminal of claim 7, further comprising a storage unit which stores an idle network list containing identifiers of idle wireless networks.

9. The mobile terminal of claim 8, wherein the control unit controls the storage unit to store an identifier for each of the idle wireless networks.

10. The mobile terminal of claim 8, wherein the control unit selects a candidate wireless network having a highest received signal strength by comparing received signal strengths of discovered wireless networks, determining whether the candidate wireless network is contained in the idle network list, and stops one of connection with the candidate wireless network or a connection process to the candidate wireless network, if the candidate wireless network is contained in the idle network list.

11. The mobile terminal of claim 7, further comprising a cellular network module for supporting connection to a cellular network, wherein the control unit determines, if the measured data rate is less than the predetermined value, that the wireless network is an idle network not connected to the Internet and releases the connection to the wireless network.

* * * * *